United States Patent [19]

Smith

[11] Patent Number: 4,458,927
[45] Date of Patent: Jul. 10, 1984

[54] FERRULES SEALS

[75] Inventor: James L. Smith, Lemont, Ill.

[73] Assignee: The United States of America as represented by the United States Department of Energy, Washington, D.C.

[21] Appl. No.: 275,165

[22] Filed: Jun. 19, 1981

[51] Int. Cl.³ .............................................. F16L 19/00
[52] U.S. Cl. ................................ 285/342; 285/348; 285/382.7; 285/353
[58] Field of Search ................ 285/382.7, 341, 342, 285/343, 348, 353

[56] References Cited

U.S. PATENT DOCUMENTS

| | | | |
|---|---|---|---|
| 2,271,936 | 2/1942 | Carson | 285/341 X |
| 2,931,671 | 4/1960 | Beeley | 285/341 X |
| 3,072,421 | 1/1963 | Lloyd et al. | 285/382.7 X |
| 3,402,949 | 9/1968 | Mahoney | 285/341 |
| 3,437,357 | 4/1969 | Rubin | 285/342 X |
| 3,578,364 | 5/1971 | Ehrenberg . | |
| 3,679,245 | 7/1972 | Ehrenberg . | |
| 4,006,921 | 2/1977 | Mohr | 285/343 X |
| 4,076,286 | 2/1978 | Spontelli | 285/382.7 X |
| 4,138,144 | 2/1979 | Pierce, Jr. | 285/341 X |
| 4,260,182 | 4/1981 | Bruner | 285/382.7 X |
| 4,309,050 | 1/1982 | Legris | 285/382.7 X |

FOREIGN PATENT DOCUMENTS

| | | | |
|---|---|---|---|
| 1054274 | 2/1954 | France | 285/382.7 |
| 956554 | 1/1957 | United Kingdom | 285/382.7 |
| 776036 | 5/1957 | United Kingdom | 285/343 |
| 914971 | 1/1963 | United Kingdom | 285/342 |

Primary Examiner—Thomas F. Callaghan
Attorney, Agent, or Firm—Sandra B. Weiss; John M. Albrecht; Michael F. Esposito

[57] ABSTRACT

A device is provided for sealing an inner tube and an outer tube without excessively deforming the tubes. The device includes two ferrules which cooperate to form a vacuum-tight seal between the inner tube and outer tube and having mating surfaces such that overtightening is not possible.

5 Claims, 3 Drawing Figures

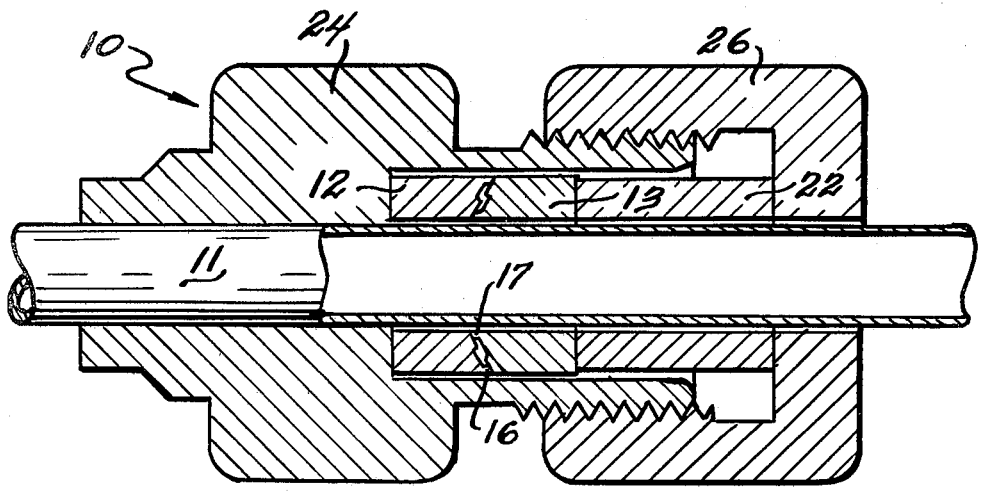
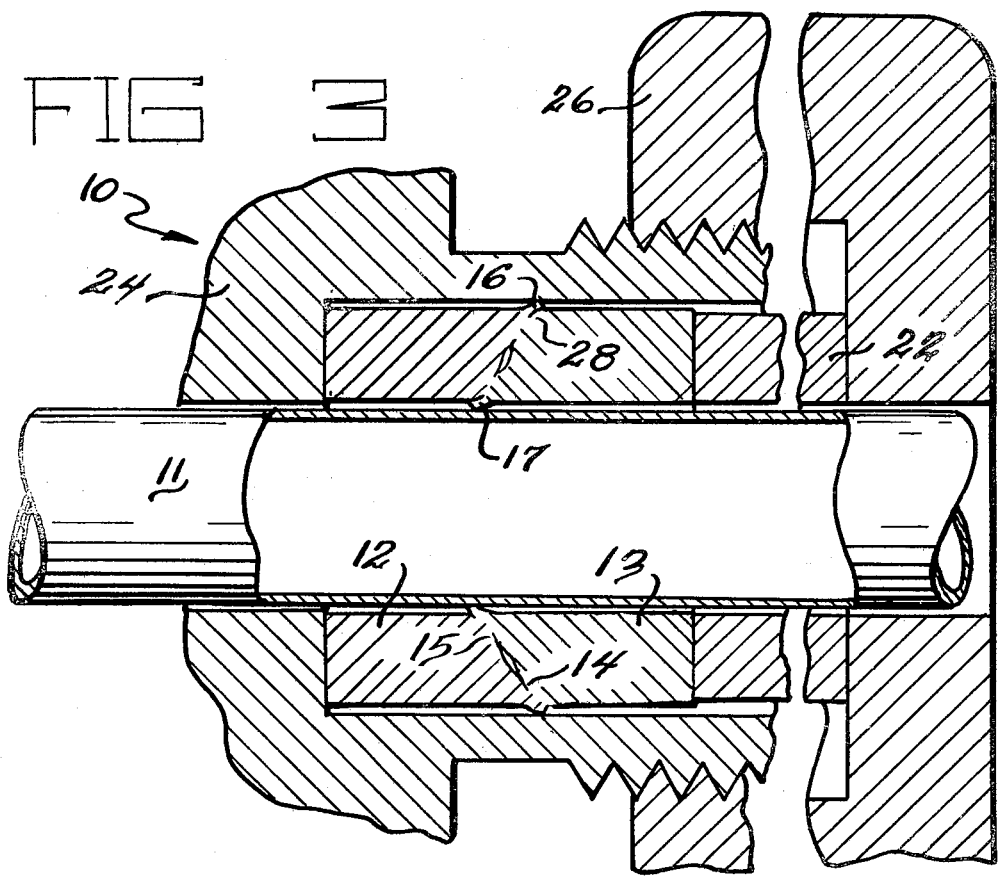

FERRULES SEALS

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

The present invention relates to a connecting arrangement in general, and more particularly to an arrangement for connecting and sealing two members, one of which surrounds the other with annular clearance and may be used to carry fluid.

Connecting arrangements for the above purpose are already known in the art. They are used, for instance, for connecting a sleeve or a bushing to a shaft extending therethrough. It is known that connectors can be made of two annular parts or ferrules that when forced together make a seal such as shown in U.S. Pat. No. 4,076,286, dated Feb. 28, 1978, to Spontelli: These prior art connectors could be overtightened causing a shoulder as shown in the patent, FIG. 1, item 68, to shove into the wall without stop, thereby damaging an inner metal tube wall.

It is therefore, an object of this invention to provide a connector that cannot be overtightened, thereby preventing the damage of an inner tube wall.

It is another object to provide a connector that provides a vacuum-tight seal between an inner tube and outer tube or encasement.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

A connector arrangement is provided to form a seal between an inner tube and an outer tube. The connector consists of two ferrules encompassing the inner tube and surrounded by the outer tube. Each ferrule has a wall encompassing the inner tube opening inclined relative to a longitudinal axis of the inner tube opening forming a convex surface on one ferrule and a concave surface on the other ferrule. A flange is located on the inclined wall of the ferrule adjacent to opposing wall edge of the mating ferrules. The ferrules are forced together causing the deformable flanges to deform to engage the inner tube and the outer tube to form a seal. The mating inclined surfaces impinge upon each other thereby preventing overtightening and puncture of the inner tube.

BRIEF DESCRIPTION OF THE DRAWINGS

FIG. 2 is a section showing the assembly to force the ferrules together.

FIG. 3 is a section showing the ferrules swaged together.

DETAILED DESCRIPTION OF THE PREFERRED EMBODIMENT

Figure 1:
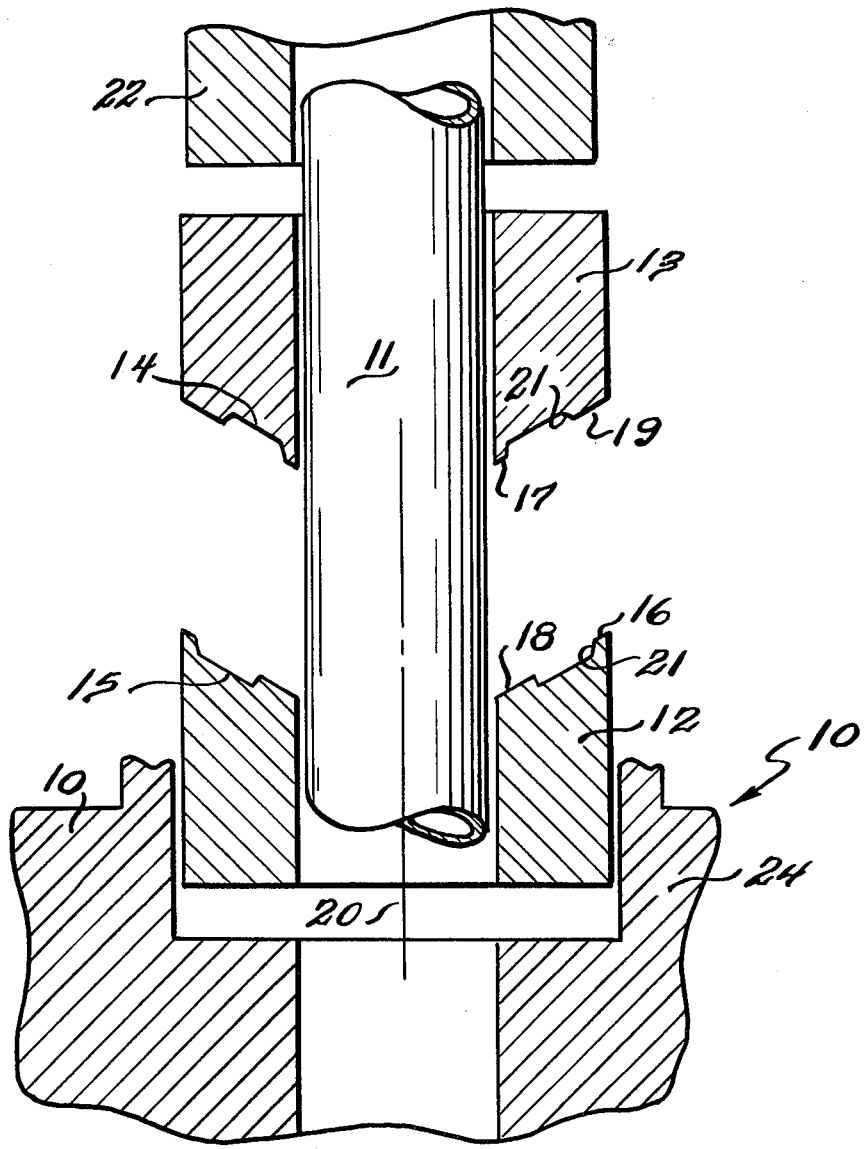
FIG. 1 is a section showing the ferrules and inner tube and outer encasement.

Referring to FIG. 1, there is shown a device for sealing an outer tube 10 or encasement to an inner tube 11. Two ferrules 12 and 13 are surrounded by outer tube 10 and encompass inner tubing 11. The inner metal tube 11 may be used for carrying a fluid. Tubing 11 may be thin-wall tubing and if so, there is a danger of cutting the tubing with a ferrule-type seal as shown by the prior art.

Ferrule 13 has a wall 14 that is inclined relative to a longitudinal axis 20 of the inner tube 11, thereby forming a convex surface. Ferrule 12 has a wall 15 that is inclined relative to the longitudinal axis 20 of the inner tube 11, thereby forming a concave surface. On both walls 14 and 15 are one or two flanges, deformable flanges 16 and 17 and second flanges 18 and 19. Deformable flanges are required, second flanges 18 and 19 may be made for ease of machining the ferrules, although for practice of the invention, only the deformable flanges are required. If used, flanges 18 and 19 are preferably two to three times as wide as flanges 16 and 17 so that flanges 16 and 17 will deform and less than one-half the overall width of walls 14 and 15; if more than half the shoulders should meet. Flanges 16 and 17 must be wide enough to deform to seal to the tube and not so wide that they will not deform or if deformed would puncture the inner tube 11 wall. The angles formed by the flanges with the inside wall 21 are not critical since the wall surfaces impinge and swage before the shoulders meet.

The walls 14 and 15 may be inclined at a thirty degree (30°) angle with respect to the longitudinal axis 20 of the inner tube 11. This angle could be varied from approximately 15 to 45 degrees. The walls 14 and 15 should preferably be inclined at the same angle for best results.

The ferrules are slip fitted and the clearance between the ferrules and the inner tube 11 and outer tube 10 should be kept small for best results. If too small, the ferrules would not go on the tubing, and with too much clearance, the deforming flanges would not engage the inner and outer tubing when deformed.

Referring to FIG. 2, there is shown the sealing assembly with ferrules 12 and 13 being forced together. Threaded coupling 26 pushes follower 22 against ferrule 13 and ferrule 12 seats against fixed threaded coupling 24. Turning threaded coupling 26 on to fixed coupling 24 causes ferrules 12 and 13 to swage together at point 28 shown in FIG. 3. Referring to FIG. 3, ferrules 12 and 13 are shown swaged together at point 28. For exaple, a torque of 30-ft lbs. may be required to cause the ferrules to swage together. Deformable flanges 16 and 17 deform to engage the inner tube 11 and outer tube 10. The mating surfaces of walls 14 and 15 impinge upon each other so that the ferrules 12 and 13 cannot be overtightened to damage the inner tube 11. Any force applied above that required to swage the ferrules causes additional pressure on the mating surfaces,, and does not cause the deformable flanges 16 and 17 to deform further.

The ferrules are made of a material compatible with the inner tube 11 and outer tube 10. "Compatible" means that the materials of the ferrules and tubing will not chemically interact and the hardness of the ferrule material is less than or equal to the hardness of the tubing material so that the deformable flanges will deform. For example, stainless steel would be used with stainless steel inner tube and outer tube. Other materials that could be used include among others, copper, plastics and rubber. Plastics and rubber would not swage, but the same operating principle as for metal applies. It is to be understood that the disclosed sealing connector is not limited to circular shaped members. The ferrules only have to engage or seat, not twisting together, thus they can be utilized with square, rectangular, or other shaped members to provide a seal with the deforming flanges.

An example of a connector made for an inner tube having an outside diameter of 0.230 inch and an outside tube having an inside diameter of 0.442 inch were two ferrules having an inside diameter of 0.231 inch and an outside diameter of 0.441 inch with the deformable flange having a length of 0.031 inch and the second flange having a length of 0.062 inch, both flanges of 0.015 inch height. The clearance between the ferrules and the tubes was 0.001 inch, this has been made as much as 0.003 inch.

The embodiments of the invention in which an exclusive property or privilege is claimed are defined as follows:

1. A sealing device comprising:
   an outer tube having a cylindrical bore extending from one end thereof, and an inner shoulder extending radially from the cylindrical bore, said outer tube adapted to receive an inner tube in said cylindrical bore,
   a first annular, cylindrical, metallic member having an inner tube opening, and having an end wall encompassing said opening inclined relative to a longitudinal axis of the inner tube opening, thereby forming a convex surface, a first annular, axially extending, deformable flange located on the edge of said first member end wall adjacent to said opening,
   a second annular, cylindrical, metallic member having an inner tube opening and having an end wall encompassing said opening inclined relative to the longitudinal axis of the inner tube opening, thereby forming a concave surface, a second annular, axially extending, deformable flange located on the edge of said second member end wall opposite to said opening, said first and second annular flanges being adapted to be in respective registration with opposing end wall portions of said second and first annular members,
   coupling means secured to the outer tube for axially forcing said first and second members together with one of said members abutting said inner shoulder of said outer tube, whereby said flanges are deformed to respectively engage the inner tube and outer tube to form a seal and said convex and concave surfaces of said first and second member are impinged upon each other, to thereby prevent overtightening and puncture of the inner tube.

2. The device of claim 1 wherein the angle formed by said convex surface relative to a longitudinal axis of the inner tube opening is in the range of fifteen to forty five degrees.

3. The device of claim 2 wherein the inner and outer tubes and first and second members are circular.

4. The device of claim 3 wherein said first member and said second member are made of metal that swage together with said force applied thereto.

5. The device of claim 4 wherein the inner tube is of a thin wall.

* * * * *